(12) United States Patent
Fujimori

(10) Patent No.: US 8,710,892 B2
(45) Date of Patent: Apr. 29, 2014

(54) CLOCK DISTRIBUTION CIRCUIT

(75) Inventor: Kazuya Fujimori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/597,366

(22) Filed: Aug. 29, 2012

(65) Prior Publication Data

US 2013/0093476 A1 Apr. 18, 2013

(30) Foreign Application Priority Data

Oct. 14, 2011 (JP) .................................. 2011-227436

(51) Int. Cl.
*H03K 3/00* (2006.01)
(52) U.S. Cl.
USPC .......................................................... 327/293
(58) Field of Classification Search
CPC ......... G06F 1/10; H03K 5/132; H04L 7/0008
USPC ....................................................... 327/293
See application file for complete search history.

(56) References Cited

U.S. PATENT DOCUMENTS

2009/0002041 A1 * 1/2009 Lin et al. ...................... 327/158

FOREIGN PATENT DOCUMENTS

| JP | 2007-336003 | 12/2007 |
| JP | 2008-010607 | 1/2008 |

* cited by examiner

*Primary Examiner* — Daniel Rojas
(74) *Attorney, Agent, or Firm* — Fitzpatrick, Cella, Harper & Scinto

(57) ABSTRACT

A clock distribution circuit is provided with a clock generation circuit configured to generate a clock signal, a clock distribution network in which the clock signal is distributed, and a sequential circuit configured to operate on the clock signal distributed through a branch point of the clock distribution network. The clock distribution circuit is further provided with a clock generation circuit configured to input as a feedback signal the clock signal that has branched from the branch point and to output the clock signal to the clock distribution network based on the inputted feedback signal and a reference clock signal. The branch point is provided at a clock driver near the clock generation circuit, among preceding stage clock drivers of the sequential circuit of the clock distribution network.

4 Claims, 6 Drawing Sheets

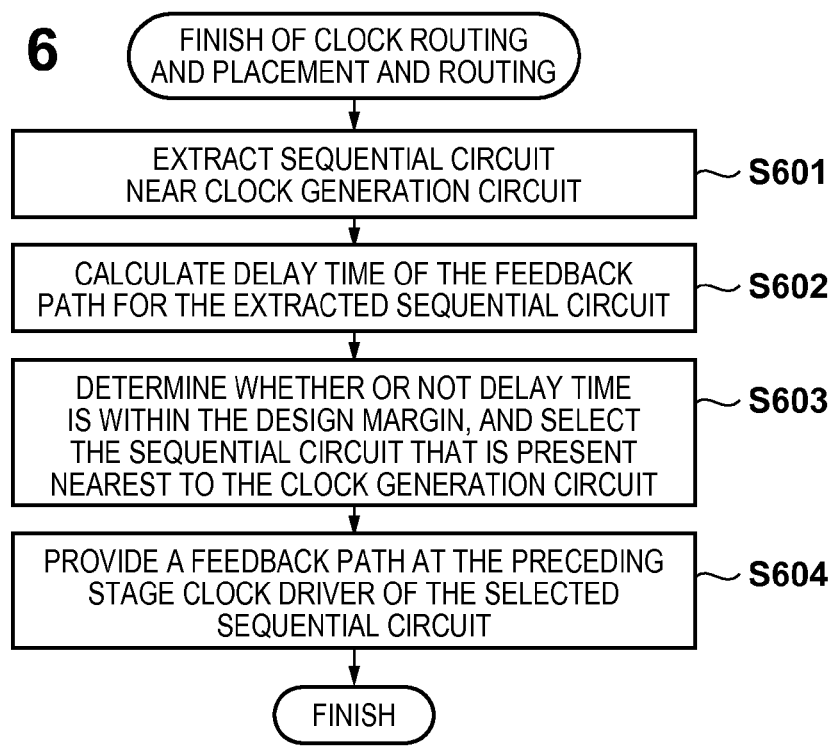
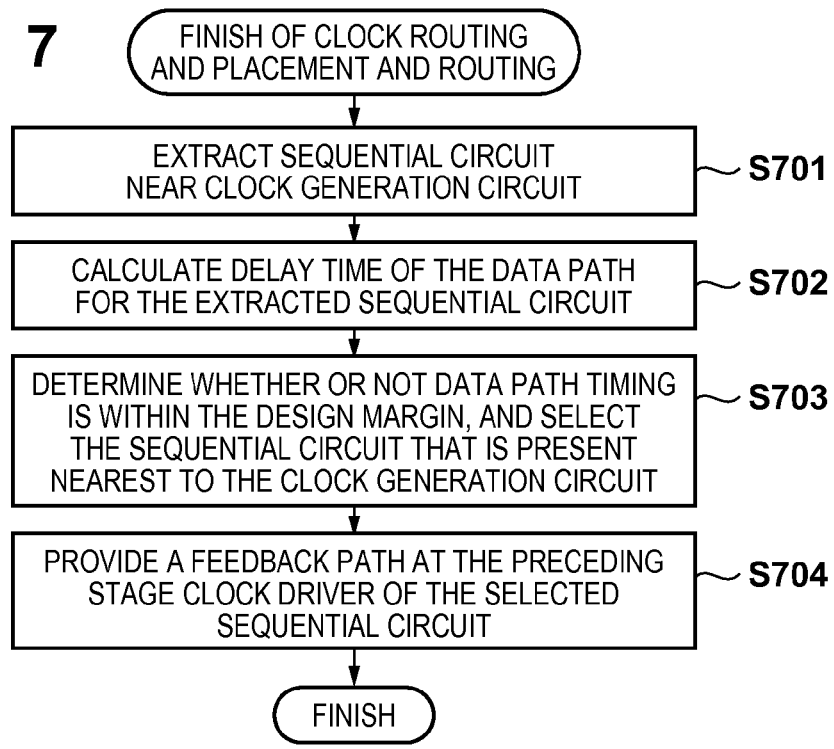

CLOCK DISTRIBUTION CIRCUIT

BACKGROUND OF THE INVENTION

1. Field of the Invention

The present invention relates to clock distribution circuits.

2. Description of the Related Art

Along with increasing miniaturization of semiconductor integrated circuits in recent years, problems of manufacturing discrepancies brought about by new factors that did not require consideration at the design stage are exerting a large influence on circuit designs in conventional semiconductor processes.

In the processes of generations where miniaturization was not so far advanced, the statistical distribution of individual differences caused by lots, wafers, materials, and the like were generally handled as discrepancies. In the processes of advanced miniaturization of the 90 nm generations onward, in addition to the aforementioned individual differences, it has also become necessary to give consideration at the design stage to individual differences of transistors and wiring within a chip due to voltage drops and machining accuracy as factors of timing discrepancies.

That is, since these factors of discrepancies influence the design values of timing, design constraints must be added of including greater timing margins. In particular, differences in electrical properties are a direct adverse factor of clock skew, and in locations such as interfaces between blocks having long distances from the clock branch, timing margins as countermeasures of discrepancies applied to route differences use an undesirably large portion of the timing in the cycle time.

In regard to these circumstances, methods are being investigated in which when clock-based synchronization circuits are designed, the phases of sequential circuits of terminals driven by a clock are adjusted using multiple phase adjustment mechanisms such as PLLs or DLLs within a chip. Forms of implementation such as those disclosed in Japanese Patent Laid-Open No. 2008-010607 for example can be used as such a method.

Here, generally a delay of a feedback loop is used in the mechanism of phase adjustments for PLLs and DLLs and the like. However, there is a probability that phase adjustments will be insufficient if routes to sequential circuits of terminals driven by the clock are designed independently.

For this reason, forms of implementation such as those described in Japanese Patent Laid-Open No. 2007-336003 for example are conceivable as methods of using a portion of a clock route to a specific sequential circuit as a shared route of a feedback loop.

However, there are currently further advances being made in miniaturization and it is necessary to give consideration at the design stage up to problems of discrepancies occurring in manufacturing processes such as exposure of mask patterns and the forming and polishing of thin films that constitute elements and wiring.

That is, even if circuits are laid out using exactly the same structure of elements and wiring, discrepancies in the manufacturing processes cannot be ignored in which shapes and electrical properties change undesirably at the manufacturing stage due to the positions of placement and the patterns of peripheral circuits.

Since systematic factors and random factors are both related in the influence of discrepancies occurring in manufacturing processes, it is difficult to accurately estimate these at the design stage.

Here, in conventional feedback loop path forming methods of phase adjustment mechanisms such as PLLs and DLLs, there is increased sharing of many of the clock routes and phase information of sequential circuits of the terminals is fed back. However, in processes where greater miniaturization is implemented, the influence of discrepancies that occur between the clock drivers and the wiring within independent routes after the feedback path branch cannot be ignored. Accordingly, it is difficult with conventional techniques to eliminate completely problems of discrepancies, and reduced precision in phase adjustments is anticipated.

Japanese Patent Laid-Open No. 2007-336003 discloses, as shown in FIG. 1, clock distribution circuits 11a and 11b that are provided with a clock generation circuit 13 having multiple DLLs or PLLs or the like, and are configured with clock distribution networks 12a and 12b (and 14; abbreviated as "CDN") for each of the clock generation circuits 13 respectively. Routes 17a and 17b are provided that perform feedback from branch points NA1 and NB1 of the sequential circuits (abbreviated as "SC") 16a and 16b having a data transfer path 18 connecting between the sequential circuits belonging to the clock distribution networks 12a and 12b (clock domains) whose clock generation circuits 13 are different.

Here, description is given giving attention to a single block 10a.

Positions where the branch points that carry out feedback are provided are determined in a following manner. These are determined such that a delay of the path from the feedback branch point NA1 to the clock input terminal of the sequential circuit 16a and a delay from the feedback branch point NA1 to the feedback clock terminal of the clock generation circuit 13 become zero. In terms of positions, branch points are selected so as to be as close as possible to a leaf so that the delay time difference becomes small.

Japanese Patent Laid-Open No. 2007-336003 gives consideration to discrepancies of delay times in manufacturing processes. The delay from a CLKOUT of the clock generation circuit 13 to a clock input of the sequential circuit 16a varies from an ideal design value. Similarly, the delay from the CLKOUT of the clock generation circuit 13 to an FBK terminal of the clock generation circuit 13 also varies from an ideal design value. Here, by using a configuration such that from the CLKOUT of the clock generation circuit 13 to the branch point NA1 is shared, the discrepancies of the shared portion can be accurately reflected in the phase adjustments of the clock generation circuits 13.

However, a difference occurs between the delay from the branch point NA1 to the clock input of the sequential circuit 16a and the delay from the branch point NA1 to the FBK terminal of the clock generation circuit 13.

In methods of forming conventional feedback circuits, the branch point NA1 is provided at the clock driver input terminal side closest to the sequential circuit. Thus, a clock driver (abbreviated as "CD") 15a2 is required within the feedback path 17 so as to match the delay time from the branch point NA1 to the sequential circuit 16a and the delay time from the branch point NA1 to the clock generation circuit 13. As a result, the clock driver 15a2 within the feedback path is influenced by discrepancies. A difference occurs between a delay time A1 from the branch point NA1 to the clock input of the sequential circuit 16a and a delay time A2 from the branch point NA1 to the FBK terminal of the clock generation circuit 13, such that correct phase information cannot be fed back and the accuracy of phase adjustments is reduced undesirably (see FIG. 2). When discrepancies occur within the feedback path, all the sequential circuits within the clock distribution network are influenced undesirably and there is a probability that the accuracy of phase adjustments will be reduced undesirably.

Furthermore, consideration is not given to the physical distance between the clock generation circuit 13 and the branch point NA1. Thus there is a probability that the feedback path 17 will become long and the wiring itself (wires wf1 and wf2) of the feedback path 17 will be influenced by discrepancies, and a difference occurs undesirably in the delay times, which will be a factor of reduced accuracy in phase adjustments.

SUMMARY OF THE INVENTION

The present invention provides a clock distribution circuit in which the influence of feedback path discrepancies is suppressed to a minimum and in which highly accurate adjustments of clock phases can be carried out.

According to one aspect of the present invention, there is provided a clock distribution circuit of a semiconductor integrated circuit having a clock generation circuit configured to generate a clock signal, a clock distribution network in which the clock signal is distributed, and a sequential circuit configured to operate on the clock signal distributed through a branch point of the clock distribution network, comprising: a clock generation circuit configured to input as a feedback signal the clock signal that has branched from the branch point and to output the clock signal to the clock distribution network based on the inputted feedback signal and a reference clock signal, wherein the branch point is provided at a clock driver near the clock generation circuit, among preceding stage clock drivers of the sequential circuit of the clock distribution network.

Further features of the present invention will become apparent from the following description of exemplary embodiments (with reference to the attached drawings).

BRIEF DESCRIPTION OF THE DRAWINGS

FIG. 6 is a flowchart showing a method of providing a feedback path based on layout data according to embodiment 1.

FIG. 7 is a flowchart showing a method of providing a feedback path based on layout data according to embodiment 3.

DESCRIPTION OF THE EMBODIMENTS

Various exemplary embodiments, features, and aspects of the invention will be described in detail below with reference to the drawings.

Embodiment 1

Figure 1:
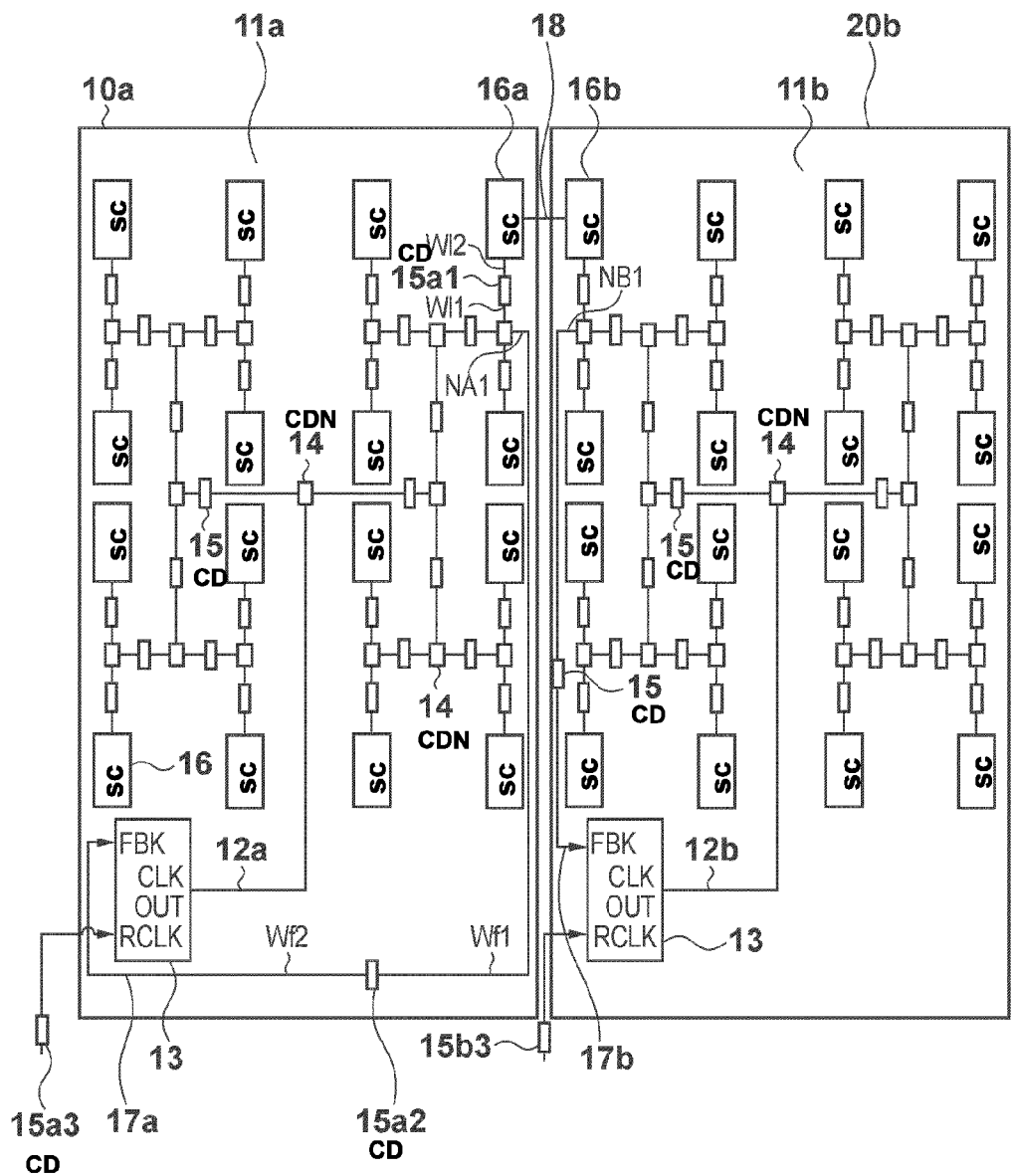
FIG. 1 is a schematic diagram showing a configuration of a clock distribution circuit according to conventional technologies.
Figure 2:
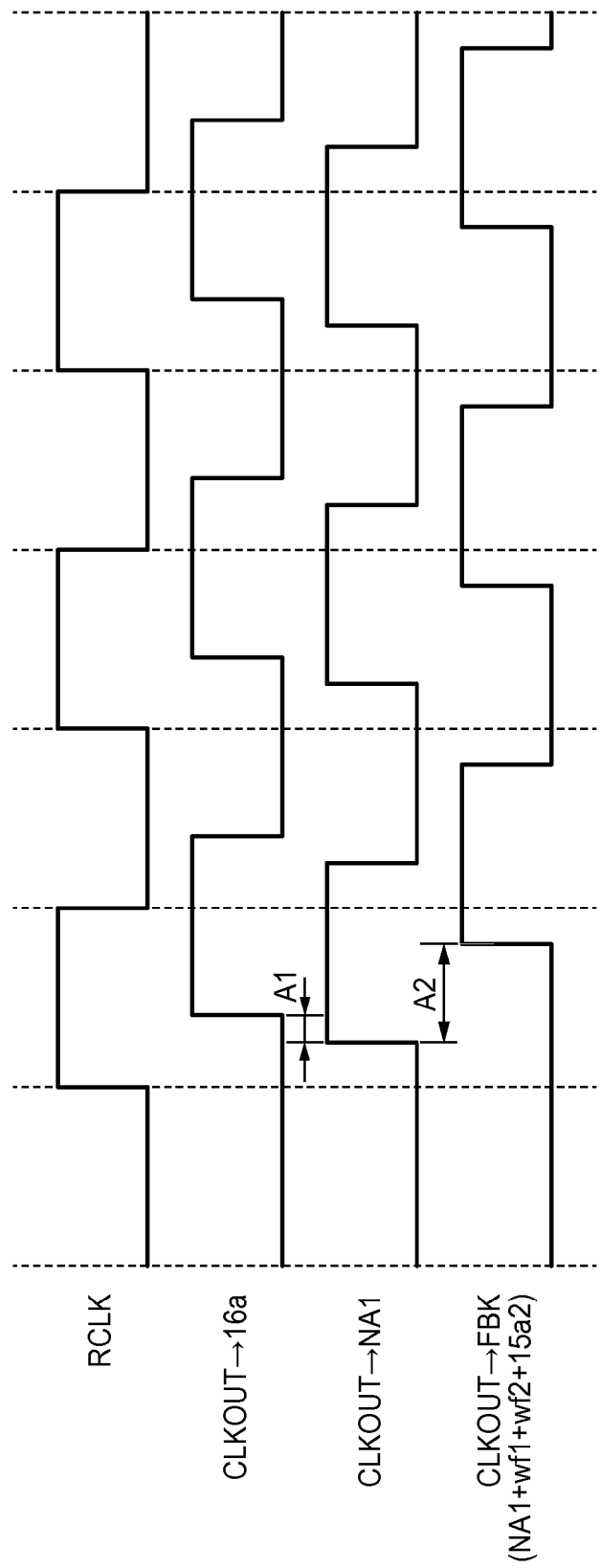
FIG. 2 is a timing chart showing timings of wave patterns of a clock signal and a feedback signal according to a conventional example.
Figure 3:
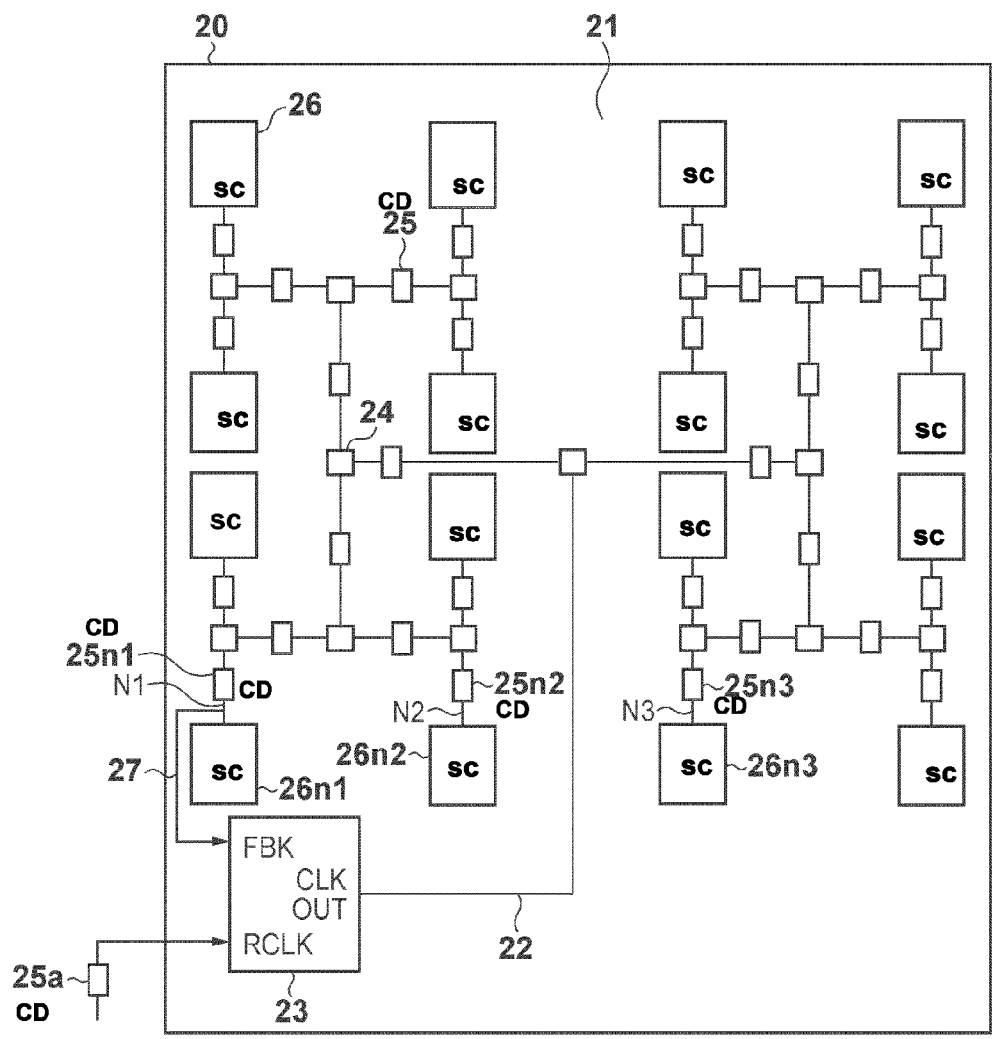
FIG. 3 is a schematic diagram showing a configuration of a clock distribution circuit according to an embodiment.

Hereinafter, description is given regarding a clock distribution circuit according to an embodiment (the abbreviations used in FIG. 1 are also used in FIGS. 3 and 5). FIG. 3 is a schematic block diagram showing one example of a configuration of a clock distribution circuit according to the present embodiment. A clock distribution circuit 21 is provided on a semiconductor integrated circuit and distributes a clock signal, which is generated as a reference signal of a frequency and phase of an external clock signal, to multiple sequential circuits 26. The sequential circuits 26 operate based on the supplied clock signal.

The clock distribution circuit 21 is provided with a clock distribution network 22, a clock generation circuit 23 such as a PLL or a DLL, a distribution circuit 24, a clock driver 25, and wiring. Of final stage clock drivers of the clock distribution network, a branch point N1 is provided at a clock driver near the clock generation circuit 23 as a feedback branch point. Description is given later concerning a method of determining the branch point N1.

It should be noted that in the present embodiment, a reference clock signal is inputted to the clock generation circuit from the outside with a same delay time.

The clock generation circuit 23 modulates the frequency and phase of the feedback signal so that the signal is in synchronization with the reference clock signal, and outputs this to the clock distribution network 22 as a clock signal. Here, the reference clock signal is an external clock signal that is supplied from the outside to a reference clock terminal RCLK of the clock generation circuit 23 through a clock driver 25n1 and wiring. The feedback signal is a clock signal that is supplied from the feedback branch point N1 to a feedback clock terminal FBK of the clock generation circuit 23 through a feedback path 27.

The clock distribution circuit 21 distributes to the multiple sequential circuits 26 the clock signal outputted from a clock output terminal CLKOUT of the clock generation circuit 23. The clock distribution network 22 is provided with wiring to constitute the clock distribution network 22, the multiple distribution circuits 24 arranged midway on the wiring, and the multiple clock drivers 25. Multiple branch points (N1, N2, and N3 in order of proximity to the clock generation circuit 23) are present on the clock distribution network 22.

Here, description is given of two methods in regard to the settings of a feedback path. One is a method of providing a feedback path by selecting a branch point of the feedback path based on layout data after clock routing and after placement and routing. The other is a method of providing a feedback path by selecting in advance a branch point at which a feedback path is provided and controlling the placement of feedback path branch points by implementing placement restrictions with a floor plan, which is an outline placement process prior to executing routing.

First, description is given regarding a method of providing a feedback path based on layout data with reference to the flowchart of FIG. 6. Here, for example, layout data after clock routing has been executed and detailed placement and routing have been executed is applied using an ordinary CTS (clock tree synthesis) technique or the like. First, a sequential circuit that is present near the clock generation circuit is extracted based on the layout data (S601). In FIG. 3, sequential circuits 26n1, 26n2, and 26n3 are present near the clock generation circuit. Accordingly, here, the feedback path branch point is set at a position on the side of the output terminal of any of the clock drivers 25n1, 25n2, and 25n3 near the clock generation circuit 23 among the final stage clock drivers 25n1, 25n2, and 25n3 of the clock distribution circuit network.

Next, a delay time of the feedback path is calculated for the extracted sequential circuit (S602). Here, the delay time is calculated when the feedback paths are provided to the sequential circuits 25n1, 25n2, and 25n3.

Next, a determination is performed as to whether or not the calculated delay time is within the design margin, and the sequential circuit that is present closest to the clock generation circuit is selected (S603). Here, suppose that the sequential circuit 25n1 is selected. Then, a feedback path is provided at the preceding stage clock driver of the selected sequential circuit (S604).

Next, description is given regarding the method of providing a feedback path by selecting in advance a branch point at which a feedback path is provided and controlling the placement position of the feedback path branch points.

Restrictions are applied so that the sequential circuit to be connected to the branch point selected in advance is placed near the clock generation circuit in the floor plan, which is an outline placement process prior to clock routing and detailed placement and routing. Following this, placement and routing and clock routing are executed based on the placement restrictions, and a timing verification is executed as to whether or not the relevant locations are within the design margin. In a case where relevant sequential circuit is not within the design margin, the placement position thereof is corrected.

Furthermore, a configuration is also possible in which placement is performed so that the clock generation circuit 23 comes closer to the feedback branch point N1 so as to be within the design margin.

As a result of setting the feedback paths taking into account the influence of feedback path discrepancies as described above, a clock distribution circuit is achieved in which highly accurate adjustments of clock phases can be carried out as in FIG. 3.

Figure 4:
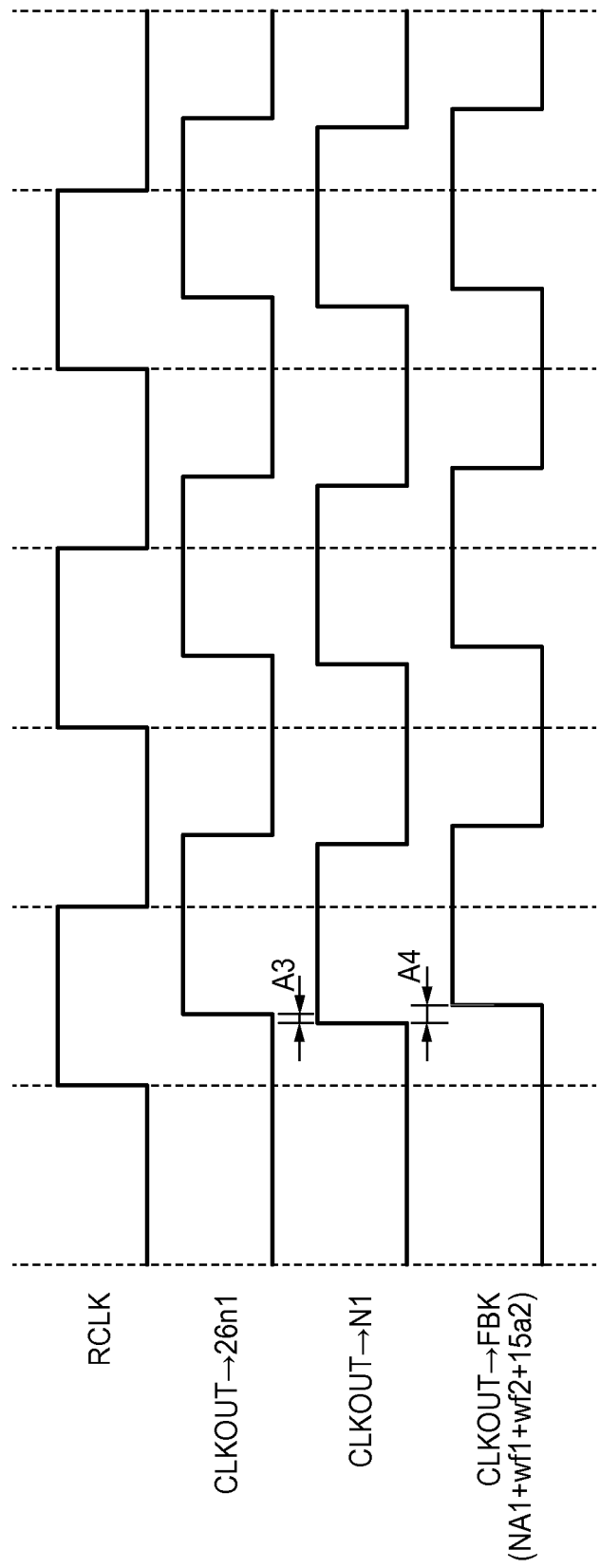
FIG. 4 is a timing chart showing timings of wave patterns of a clock signal and a feedback signal according to an embodiment.

In FIG. 3, the branch point is provided at the output terminal of the clock driver 25n1 for example. Since the feedback path 27 is obtained from the output terminal side of the clock driver 25n1 near the clock generation circuit 23, it is configured fundamentally of wiring only, and compositional elements that cause delay discrepancies can be suppressed to a minimum. For this reason, the difference between a delay time A3 from the branch point N1 to the leaf sequential circuit 26n1 and a delay time A4 from the branch point N1 to the clock generation circuit 23 can be reduced (see FIG. 4). Furthermore, compared to conventional technologies, there is a high probability of configuring a short route of the feedback path, and therefore the influence received from peripheral circuits can be kept small.

It should be noted that in FIG. 3, the feedback path 27 is constituted of wiring only, but a feedback driver may also be inserted as long as this is within the design margin. Furthermore, a configuration is also possible allowing placement to be performed so that the clock generation circuit 23 comes closer to the feedback branch point N1 so as to be within the design margin.

Consequently, the clock signal distributed through the same clock distribution path is distributed to the clock input of the sequential circuit 26n1 provided with the branch point N1 and a FBK terminal of the clock generation circuit 23 as a feedback signal so that the distribution delay from the branch point N1 is substantially equivalent. For this reason, the clock signal at the FBK terminal of the clock generation circuit has the same frequency as the clock signal of the clock input of the sequential circuit 26n1, and phase adjustments can be carried out correctly so that the phases are substantially equivalent.

Embodiment 2

In the foregoing embodiment 1, the branch point N1 of the feedback path was obtained from the output terminal of the preceding stage clock driver 25n1 of the sequential circuit near the clock generation circuit 23. However, in a case where concentration of wiring is occurring near the clock generation circuit 23, the branch point may be provided so that wire congestion does not occur. For example, consider a case where a circuit having multitudinous connection relationships with SRAM or with another block, or a circuit that generates a control signal is present near the clock generation circuit. When the clock driver branch point is determined so as to avoid a concentration of wiring, phase adjustments can be performed so that wire congestion does not occur. Other than this, this is the same as embodiment 1.

Embodiment 3

In embodiment 3, the branch point is provided at an output terminal of a preceding stage clock driver of a sequential circuit having low relevance to at least one of function and performance, that is, having a data path in which there is leeway in the timing design, or a sequential circuit having data path in which there is a large timing margin.

As in embodiment 1, there are two methods of setting the feedback path. One is a method of selecting the feedback path branch point by extracting a path in which there is leeway in the timing design based on layout data after clock routing and after placement and routing. The other is a method of providing a feedback path by extracting in advance a data path in which there is leeway in the timing design, and controlling the placement of feedback path branch points by implementing placement restrictions with a floor plan, which is an outline placement process prior to executing placement and routing.

First, description is given regarding a method of providing a feedback path based on layout data with reference to the flowchart of FIG. 7. First, a sequential circuit that is present near the clock generation circuit is extracted based on the layout data (S701). Next, a delay time of the data path is calculated for the extracted sequential circuit (S702). Next, a determination is performed as to whether or not the data path timing of the extracted sequential circuit is within the design margin, and the sequential circuit having the greatest leeway in the margin is selected (S703). Then, a feedback path is obtained from the output terminal side of the preceding stage clock driver of the selected sequential circuit (S704).

Next, description is given regarding the method of providing a feedback path by extracting in advance a path in which there is leeway in the timing design and performing control so that the branch point of the path is placed near the clock generation circuit.

A method in which accurate delay times are calculated by executing up to placement and routing and a method of estimating delay times by executing up to provisional placement and routing are conceivable as methods of extracting a data path in which there is a leeway in the timing design.

Restrictions are applied so that the sequential circuit having in advance a data path in which there is a leeway in the timing design is placed near the clock generation circuit in the floor plan, which is an outline placement process prior to clock routing and prior to detailed placement and routing.

Placement and routing are executed based on these placement restrictions.

Next, timing verification is executed as to whether or not the relevant locations are within the design margin. In a case where they are not within the design margin, the placement position of the relevant sequential circuit or clock generation circuit is corrected, and timing verification is executed again. This is iterated and a feedback path is provided so as to be within the design margin.

By executing the foregoing method, the influence of discrepancies originating in manufacturing processes can be suppressed for data paths in which there is a leeway in the timing design, and the precision of phase adjustments can be improved. Other than this, this is the same as embodiment 1.

Embodiment 4

In embodiment 4, a new sequential circuit for a feedback signal (dummy sequential circuit) is provided to the clock distribution network, and is configured so that it is placed near the clock signal generation circuit. A branch point is set at the input terminal of the dummy sequential circuit and feedback of position information is carried out. Although it is preferable that the dummy sequential circuit and the branch point are connected by wiring only, in a case where delay adjustments are required between the dummy sequential circuit and the branch point, there is no problem in this being configured with multiple stages of clock drivers.

In regard to connection locations between the dummy sequential circuit and the clock distribution network, this may be determined from accurate placement conditions after actually executing placement and routing, or may be determined by estimating placement conditions after executing provisional placement and routing.

By configuring as described above, even in a case where a nearby placed sequential circuit is a sequential circuit having high relevance to performance or function, phase adjustments can be carried out without adversely influencing the timing design between domains by using a dummy sequential circuit. Furthermore, even in a case where wiring concentration is occurring peripheral to nearby placed sequential circuits, the newly provided sequential circuit can be placed flexibly near the clock generation circuit and phase adjustments can be carried out without causing wire congestion.

Embodiment 5

In embodiment 5, attention is given to a case where multiple clock domains managed by different clocks are present. Giving attention to the data transfer path that connects between circuits belonging between the different clock domains, a branch point is provided at the output terminal of a preceding stage clock driver of the sequential circuit having the data transfer path.

Figure 5:
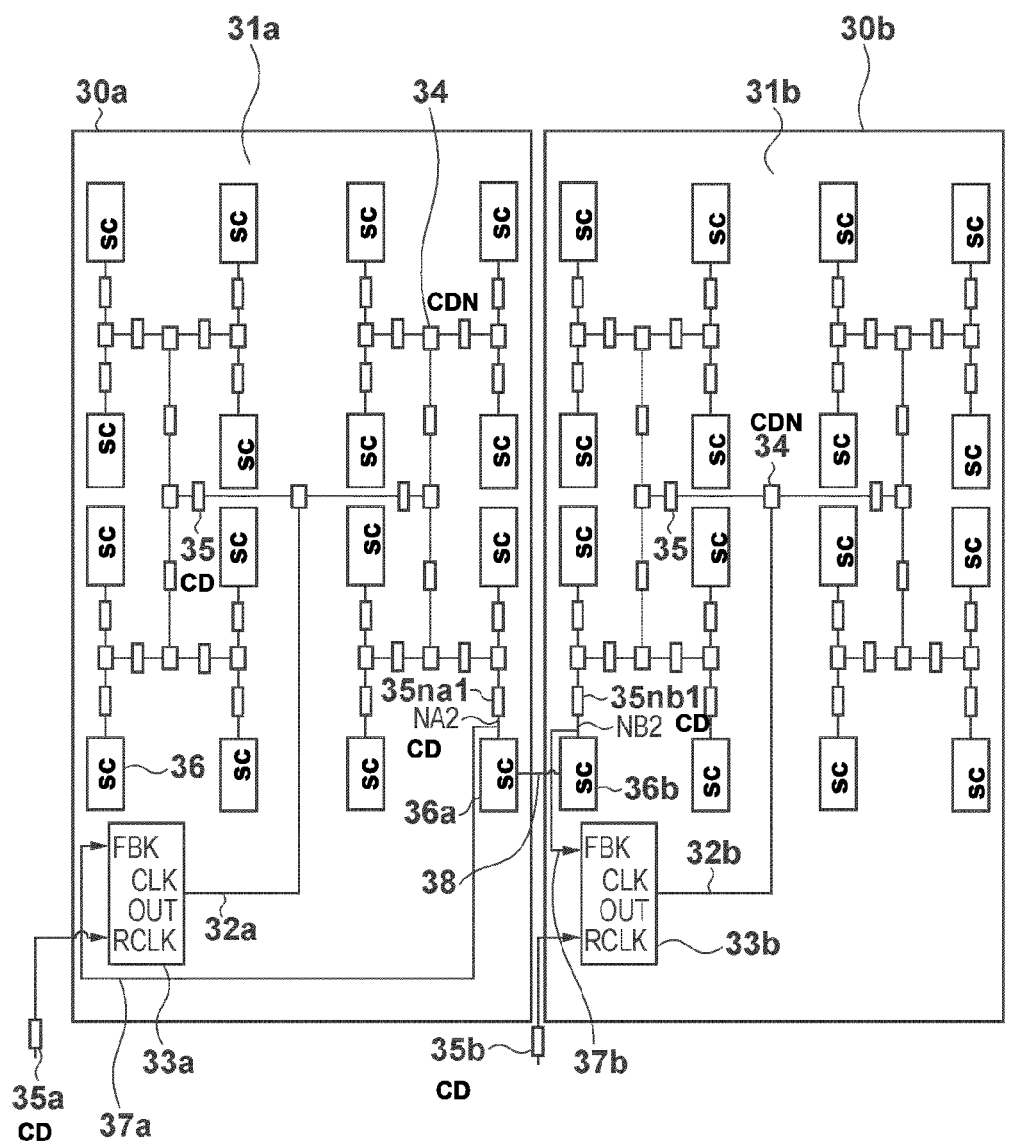
FIG. 5 is a schematic diagram showing a configuration example of a clock distribution circuit according to another embodiment.

FIG. 5 is a schematic block diagram showing one example of a clock distribution circuit according to the present embodiment. A clock distribution circuit 31a is provided within a semiconductor integrated circuit and distributes a clock signal, as a first reference clock signal, which is generated as a reference signal of a frequency and phase of an external clock signal, to multiple sequential circuits 36. Here, a sequential circuit 36a and a sequential circuit 36b are connected for data transfer. A data transfer path 38 constitutes a data transfer path between different domains.

The clock distribution circuit 31a is provided with a clock distribution network 32a, a clock generation circuit 33a such as a PLL, a distribution circuit 34, a clock driver 35, and wiring. Of final stage clock drivers of the clock distribution network, the branch point NA2 is provided at a clock driver near the clock generation circuit as a branch point for a first feedback signal.

Here, the branch point for the first feedback signal is set at a position on the output terminal side of a clock driver 35na1 near the clock generation circuit 33a of the final stage clock drivers of the clock distribution network. Accordingly, the feedback path 37a is configured so that shift in the timing due to manufacturing discrepancies in the actual circuit layout is within the design margin. Since the feedback path 37a is obtained from the output terminal side of the clock driver 35na1 near the clock generation circuit 33a, it can be configured fundamentally of wiring only, and compositional elements that cause delay discrepancies can be kept to a minimum. For this reason, the delay time from the branch point NA2 to the leaf sequential circuit 36a and the delay time from the branch point NA2 to the clock generation circuit 33a can be matched, and the accuracy of phase adjustments can be improved. It should be noted that in FIG. 5, the feedback path 37a is constituted of wiring only, but a feedback driver may also be inserted as long as this is within the design margin. Furthermore, a configuration is also possible allowing placement to be performed so that the clock generation circuit 33a comes closer to the feedback branch point NA2 so as to be within the design margin.

Consequently, the clock signal distributed until the branch point NA2 through the same clock distribution path is distributed to the clock input of the sequential circuit 36a provided with the branch point NA2 and an FBK terminal of the clock generation circuit 33a so that the distribution delay from the branch point NA2 is substantially equivalent. For this reason, the clock signal at the FBK terminal of the clock generation circuit has the same frequency as the clock signal of the clock input of the sequential circuit 36a, and phase adjustments can be carried out correctly so that the phases are substantially equivalent.

The circuit configuration is the same in the block 30b that is managed by a different clock.

The clock generation circuit 33b modulates the frequency and phase of a second feedback signal so that it is in synchronization with a second reference clock signal, and outputs this to the clock distribution network 32b as a second clock signal. Here, the second reference clock signal is an external clock signal that is supplied from the outside to a reference clock terminal RCLK of the clock generation circuit 33b through a clock driver 35b and wiring. Here, the second reference clock signal is the same as the first reference clock signal. The second feedback signal is a second clock signal that is supplied from a second feedback branch point NB2 to the feedback clock terminal FBK of the clock generation circuit 33b through a wire of a feedback path 37b.

With a method of determining the branch point, the branch point is set at an output terminal side of a clock driver 35nb1 near the clock generation circuit in a same manner as the branch point of the clock 30a.

The sequential circuit 36a of the sequential circuits 36 connected to the block 30a and the sequential circuit 36b of the sequential circuits 36 connected to the block 30b are connected by a data transfer path 38. That is, there is a transfer of data between the sequential circuit 36a and the sequential circuit 36b, and therefore it is necessary to align the phases of the clock signals supplied to both of these. For this reason, a branch point is set at each of the output terminal sides of the clock drivers 35na1 and 35nb1 near the clock generation circuits 33a and 33b of the sequential circuits 36a and 36b having the data transfer path. In FIG. 5, the first feedback branch point NA2 of the clock distribution network 32a is provided between the output terminal of the clock driver 35na1 and the clock input terminal of the sequential circuit 36a. Similarly, the second feedback branch point NB2 of the clock distribution network 32b is provided between the output terminal of the clock driver 35nb1 and the clock input terminal of the sequential circuit 36b. The phase of the first feedback signal is substantially equivalent to the phase of the clock signal of the clock input of the sequential circuit 36a.

The first feedback signal and the first reference clock signal are inputted to the clock generation circuit 33a, and the clock generation circuit 33a outputs the first clock so that the phase difference between phase comparators within the clock generation circuits becomes zero. Similarly, the phase of the second feedback signal is substantially equivalent to the phase of the clock signal of the clock input of the sequential circuit 36b. The second feedback signal and the second reference clock signal are inputted to the clock generation circuit 33b, and the clock generation circuit 33b outputs the second clock so that the phase difference between phase comparators within the clock generation circuits becomes zero. And as long as same-phase reference signals are inputted to the clock generation circuits 33a and 33b, the first clock of the FBK terminal of the clock generation circuit 33a and the second clock of the FBK terminal of the clock generation circuit 33b will have the same phase. Accordingly, the phase of the first clock of the sequential circuit 36a and the phase of the second clock of the sequential circuit 36b can be substantially matched. As a result, the timing of data transfers between the sequential circuit 36a and the sequential circuit 36b can be matched, and the accuracy of phase adjustments between different domains can be improved without adversely influencing data transfers.

Here, consider the delay discrepancies caused by manufacturing processes. The distribution delay from the CLKOUT of the clock generation circuit 33a to the clock input of the sequential circuit 36a and the delay from the CLKOUT of the clock generation circuit 33a to the FBK terminal of the clock generation circuit 33a are influenced by discrepancies. However, since the configuration is such that from the CLKOUT of the clock generation circuit 33a to the branch point NA2 is shared, the discrepancies of the shared portion can be accurately reflected in the phase adjustment of the clock generation circuit 33a. An essential influence of delay caused by manufacturing processes is the difference between the delay caused by wiring from the branch point NA2 to the clock input of the sequential circuit 36a and the delay caused by wiring from the branch point NA2 to the FBK terminal of the clock generation circuit 33a. Since no clock driver is configured within the feedback path and shorter wiring can be configured, the influence of discrepancies can be reduced. This is the same also in regard to the clock distribution network 32b. Accordingly, a clock distribution circuit can be configured in which the influence of discrepancies caused by manufacturing processes can be suppressed in the data transfer path from the sequential circuit 36a to the sequential circuit 36b and highly accurate phase adjustments can be carried out.

It should be noted that in addition to FFs and registers, the sequential circuits 36a and 36b may be any circuit that outputs in synchronization with a clock. Furthermore, a configuration is possible in which the clock generation circuits 33a and 33b are connected to the branch points NA2 and NB2 via plurality of buffers without branch points.

With the clock distribution circuit according to the present invention, as shown in FIG. 3, the branch point of the feedback path provides a feedback path from the output terminal side of the clock driver near the clock generation circuit, thereby keeping compositional elements that cause discrepancies to a minimum and enabling correct phase adjustments to be carried out.

Further still, by providing the branch point at the clock driver where concentrations of wiring do not occur, phase adjustments can be carried out easily without causing wire congestion.

Further still, the branch point can be provided at a clock driver of a sequential circuit having low relevance to performance or function (a sequential circuit having a data path with timing design leeway). By doing this, phase adjustments can be carried out easily without adversely influencing the timing adjustments within the block.

Further still, a sequential circuit can be configured for providing a feedback path near the clock generation circuit and the branch point can be provided from the clock driver. By doing this, phase adjustments can be carried out easily without adversely influencing the timing adjustments within the block and between blocks.

Further still, the branch point can be provided at a preceding stage clock driver of a sequential circuit having a data transfer path with a block managed by another clock distribution network (clock domain). By doing this, phase adjustments can be carried out easily without adversely influencing the timing adjustments between blocks.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2011-227436, filed Oct. 14, 2011 and 2012-172302, filed Aug. 2, 2012, which are hereby incorporated by reference herein in their entirety.

What is claimed is:

1. A clock distribution circuit of a semiconductor integrated circuit, the clock distribution circuit comprising:
a clock generation circuit configured to generate a clock signal;
a clock distribution network in which the clock signal is distributed in a clock domain; and
a sequential circuit configured to operate on the clock signal distributed through a branch point of the clock distribution network,
wherein said clock generation circuit is configured to input as a feedback signal the clock signal that has branched from the branch point and to output the clock signal to said clock distribution network based on the inputted feedback signal and a reference clock signal,
and wherein the branch point is provided to a preceding stage clock driver of a sequential circuit having a data transfer path with a block managed by another clock domain, among clock drivers near said clock generation circuit.

2. The clock distribution circuit according to claim 1, wherein a feedback path that connects the branch point and said clock generation circuit is configured so as to avoid wiring concentration.

3. The clock distribution circuit according to claim 1, wherein said clock distribution network includes a sequential circuit for a feedback signal near said clock generation circuit, and has a branch point at said sequential circuit for the feedback signal.

4. A clock distribution circuit of a semiconductor integrated circuit, the clock distribution circuit comprising:
- a clock generation circuit configured to generate a clock signal;
- a clock distribution network in which the clock signal is distributed in a clock domain; and
- a sequential circuit configured to operate on the clock signal distributed through a branch point of the clock distribution network,
- wherein said clock generation circuit is configured to input as a feedback signal the clock signal that has branched from the branch point and to output the clock signal to said clock distribution network based on the inputted feedback signal and a reference clock signal,
- and wherein the branch point is provided to a preceding stage clock driver of a sequential circuit, selected from among clock drivers near said clock generation circuit based on a delay time of at least one of a feedback path and a data path of the sequential circuit.

\* \* \* \* \*